Dec. 15, 1953　　　K. I. POSTEL ET AL　　　2,662,375
ROTARY PUMP AND MOTOR HYDRAULIC TRANSMISSION
Filed Oct. 14, 1947　　　　　　　　　　　　　　5 Sheets-Sheet 1

INVENTORS
KENNETH I. POSTEL
JOSEPH P. HORVATH
BY
*Ralph L. Tweedale*
ATTORNEY

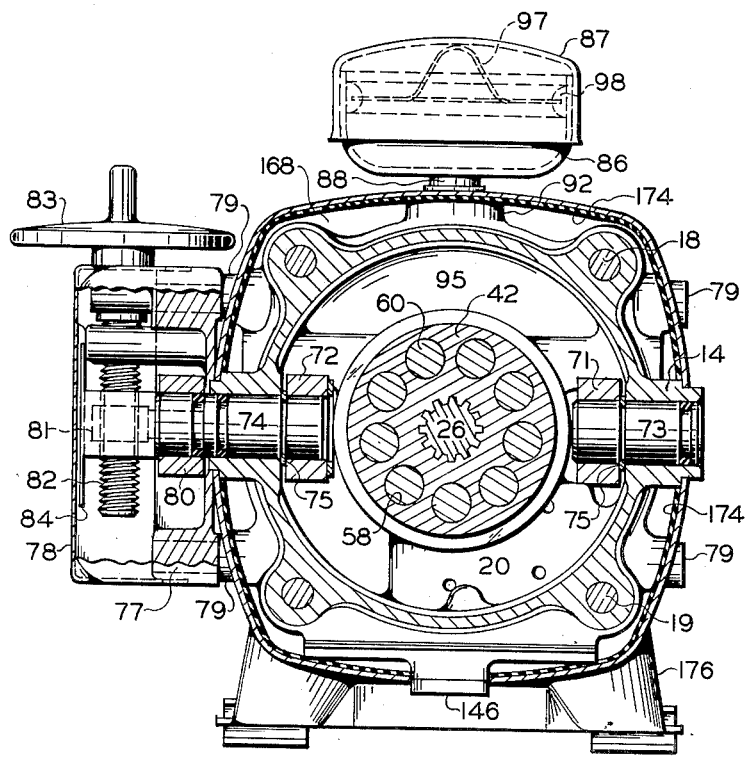

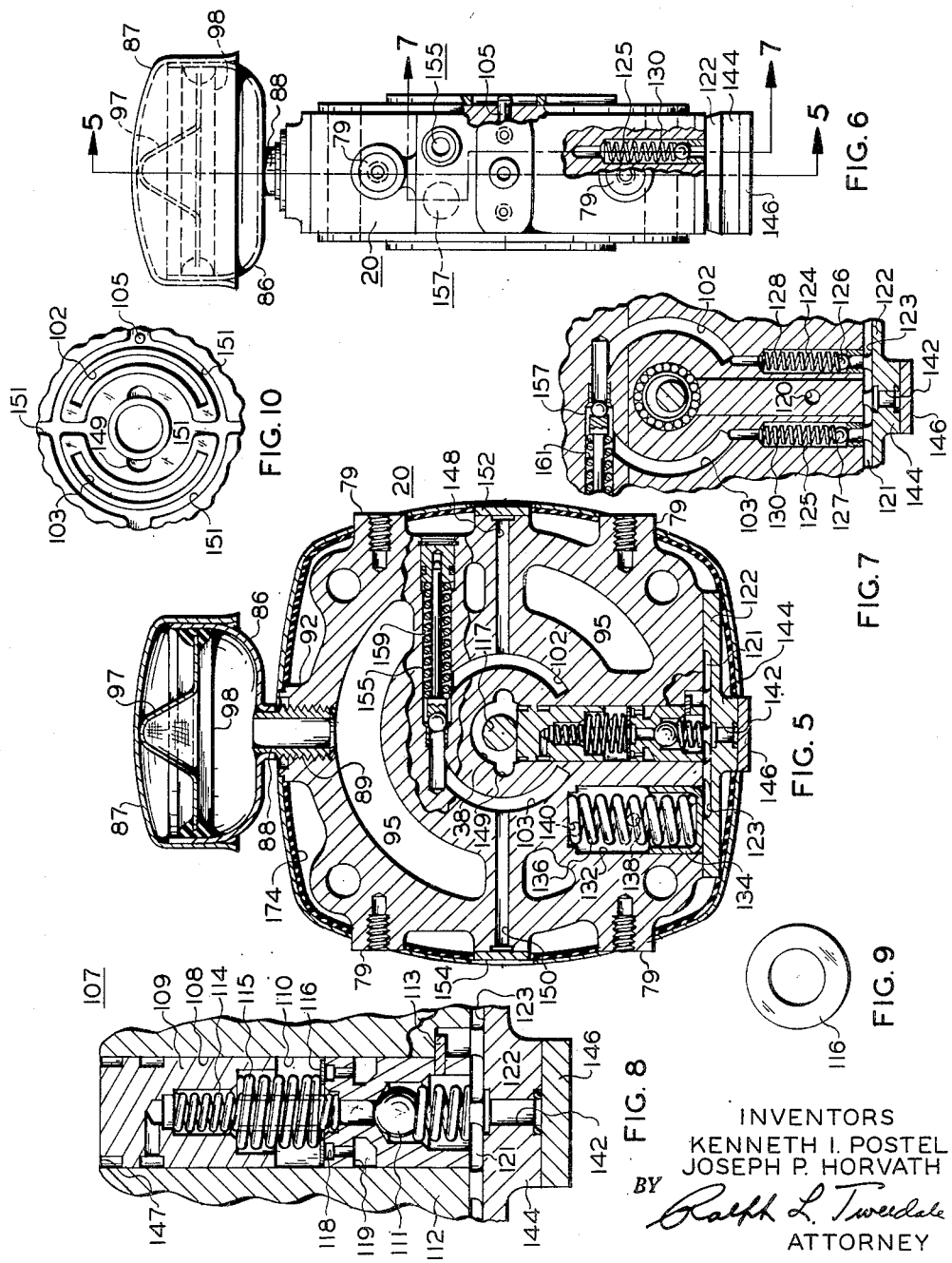

Dec. 15, 1953   K. I. POSTEL ET AL   2,662,375
ROTARY PUMP AND MOTOR HYDRAULIC TRANSMISSION
Filed Oct. 14, 1947                                 5 Sheets-Sheet 4

INVENTORS
KENNETH I. POSTEL
JOSEPH P. HORVATH
BY
*Ralph L. Tweedale*
ATTORNEY

Dec. 15, 1953     K. I. POSTEL ET AL     2,662,375
ROTARY PUMP AND MOTOR HYDRAULIC TRANSMISSION
Filed Oct. 14, 1947     5 Sheets-Sheet 5

INVENTORS
KENNETH I. POSTEL
JOSEPH P. HORVATH
BY
*Ralph L. Tweedale*
ATTORNEY

Patented Dec. 15, 1953

2,662,375

UNITED STATES PATENT OFFICE 2,662,375

ROTARY PUMP AND MOTOR HYDRAULIC TRANSMISSION

Kenneth I. Postel and Joseph P. Horvath, Detroit, Mich., assignors to Vickers Incorporated, Detroit, Mich., a corporation of Michigan Application October 14, 1947, Serial No. 779,732

1 Claim. (Cl. 60—53)

This invention relates to power transmissions, particularly to those of the type comprising two or more fluid pressure energy translating devices, one of which may function as a pump and another as a fluid motor.

The invention is more particularly concerned with a power transmission system incorporating a fluid pump and motor construction of the type having a rotary cylinder barrel provided with axial cylinders and pistons reciprocal therein which abut against a rotating thrust plate, the axis of which is inclined to the axis of rotation of the cylinder barrel.

It is a general object of this invention to provide a fluid energy translating device of this type which is of simple and reliable construction, suitable for low cost manufacture, and capable of high performance over long periods of service.

It is a more particular object of this invention to provide for a transmission of the type mentioned, wherein a closed circuit is formed, a replenishing pump circuit which will provide fluid to replace leakage and maintain the pistons against the thrust plate at one controlled pressure while providing fluid under pressure at a different controlled pressure for the operation of servo controls.

It is also an object of this invention to provide a novel and economical means for efficiently cooling the transmission.

It is a further object of this invention to provide means for substantially reducing sounding board effects during operation of the transmission and cooling system.

It is another object of the invention to provide a protective shroud for the transmission.

Further objects and advantages of the present invention will be apparent from the following description, reference being had to the accompanying drawings wherein a preferred form of the present invention is clearly shown.

In the drawings:

Figure 2 is a sectional view on line 2—2 of Figure 1.

Figure 3 is an end view of a valve plate.

Figure 4 is an end view of the cylinder barrel.

Figure 5 is a sectional view taken on line 5—5 of Figure 6.

Figure 6 is a side view of the valve block.

Figure 7 is a partial sectional view taken on line 7—7 of Figure 6.

Figure 8 is an exploded sectional view of the replenishing pump shown in Figure 5.

Figure 9 is a top view of the micarta disc shown in Figures 5 and 8.

Figure 10 is a partial front view of the valve block.

Figure 1:
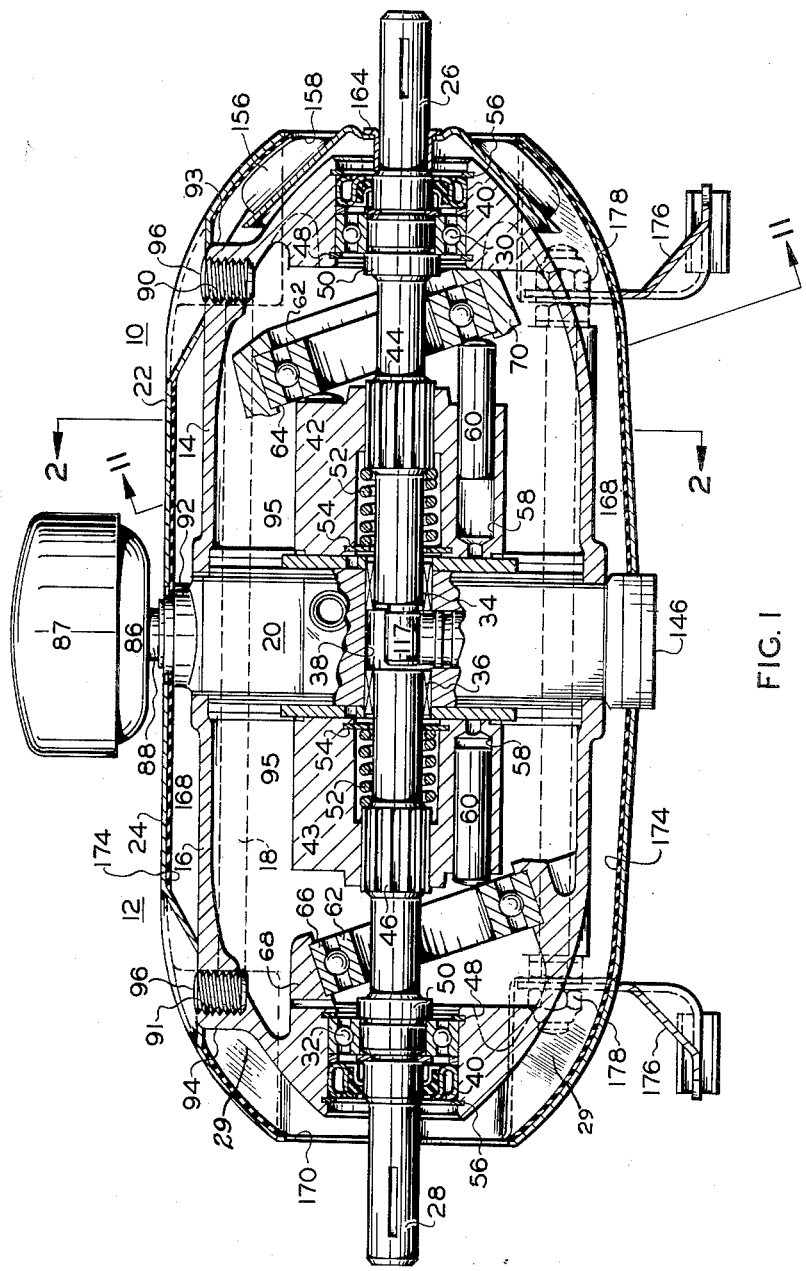
Figure 1 is a sectional view of a preferred form of the present invention.
Figures 11, 12:
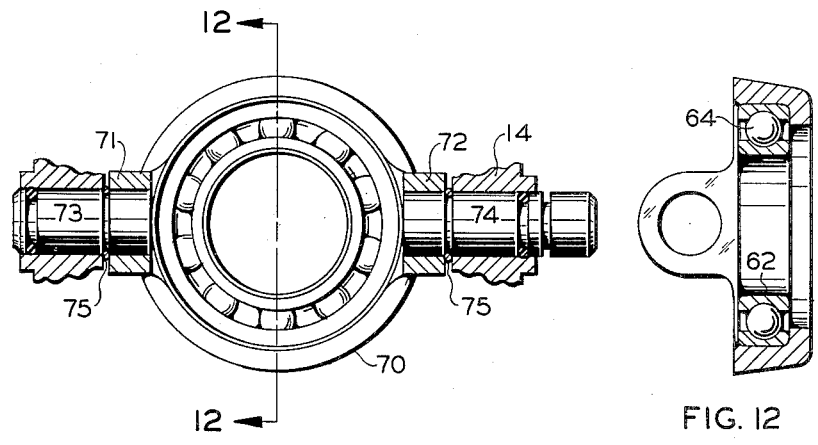
Figure 11 is a sectional view taken on line 11—11 of Figure 1.
Figure 12 is a sectional view taken on line 12—12 of Figure 11.

Referring now to Figure 1 there is shown a power transmission comprising a reversible variable displacement pump section indicated by the numeral 10 and a fixed displacement motor section indicated by the numeral 12. The pump and motor sections 10 and 12 are provided with casings 14 and 16, respectively, which by means of suitable upper through bolts 18 and lower through bolts 19 have their open ends held in abutment against a valve block member 20 which forms a partition between the two casings.

The casings may preferably be die cast of a suitable aluminum alloy or other non-ferrous metal. Surrounding the casings 14 and 16 is a tubular shroud formed in two bell shaped sections 22 and 24 which are connected with their largest open ends in abutting relationship by the bolts 18.

Figure 17:
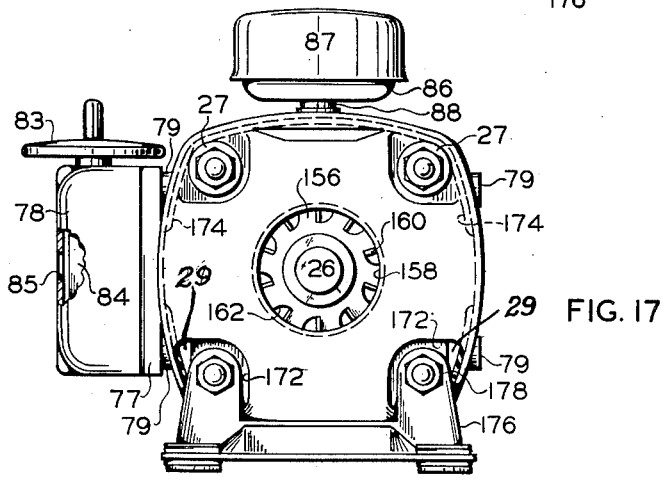
Figure 17 is an end view of the transmission.

As shown in Figure 17, rubber grommets 27 are placed between the shrouds and the casings, at the ends thereof where the through bolts 18 are inserted, in order to avoid metal to metal contact.

The shrouds may be stamped from suitable thin sheet metal and are provided with indentations of pyramidal shape, indicated by the numeral 29, where the bolts 18 and 19 are inserted. The shroud protects the casings and transmission from impact damage. The indentations provide walls for strengthening the shroud adding to the protective qualities of the latter. In addition, the shroud serves to supply an air space between the casing and the shroud which provides part of an air cooling system hereinafter described.

The through bolts 18 serve to connect the casings in abutting relationship to the valve block and also to maintain the two shroud sections with their largest open ends in abutting relationship with each other. The through bolts 19, however, serve only to connect the two casing sections to each other as the nuts threaded at each end pass through holes made in the lower indentations of the shroud sections and abut the ends of the casings rather than the shrouds.

A pump shaft 26 and a motor shaft 28 are journalled on bearings 30 and 32 in their respective housings and on needle bearings 34 and 36, the latter of which are mounted in a through hole 38 of the valve block 20. Suitable oil seals 40 are provided where the shafts 26 and 28 extend through the casings 14 and 16.

Mounted on the pump and motor shafts 26 and 28 are pump and motor cylinder barrels 42 and 43, respectively, which are in driving engagement with the shafts by means of loose fitting spline sections indicated by the numerals 44 and 46. The shafts are maintained in position by means of retaining washers 48 which fit into grooves provided in the casings and engage the outer surfaces of flanges 50 formed on the shafts and by retaining springs 52 engaging the inner surfaces of the spline shaft sections. Retainer washers 54 fitted into grooves formed in the cylinder barrels hold the springs 50 in abutment against the inner surfaces of the splined sections. Retainer washers 56 cooperate with the retainer washers 48 for positioning the shaft bearings 30 and 32 and the oil seal 40.

The cylinder barrels 42 and 43 are provided with a plurality of cylindrical holes 58 within which pistons 60 are reciprocably mounted. The outer edges of the pistons are preferably rounded and are adapted to drivably engage the inner races 62 of thrust bearings 64 and 66. The motor thrust bearing 66 is positioned in a mounting box 68 provided in the motor casing member 16, the angle of inclination of which is fixed. The pump thrust bearing 64 is mounted in a yoke 70, the angle of inclination of which may be shifted from neutral to either side of neutral so as to vary the volume of the pump from zero to maximum and also reverse the direction of flow to the motor.

As shown more clearly in Figures 2, 11, 12, and 15, the yoke 70 is provided with arms 71 and 72 which are respectively mounted on pintles 73 and 74 extending into the pump casing. The pintles 73 and 74 are mounted within bosses formed on opposite sides of the pump casing 14 with the aid of snap rings 75. A pintle lock 76 connected to the arm 72 of the yoke 70, which is longer than the arm 71, and butt welded to the inner end surface of the pintle 74 rigidly connects the arm 72 to the pintle 74 so that rotation of the latter will change the angle of inclination of the yoke 70. The pintle 74 which is longer than the pintle 72 extends through a hole provided for that purpose in the shroud.

Figure 16:
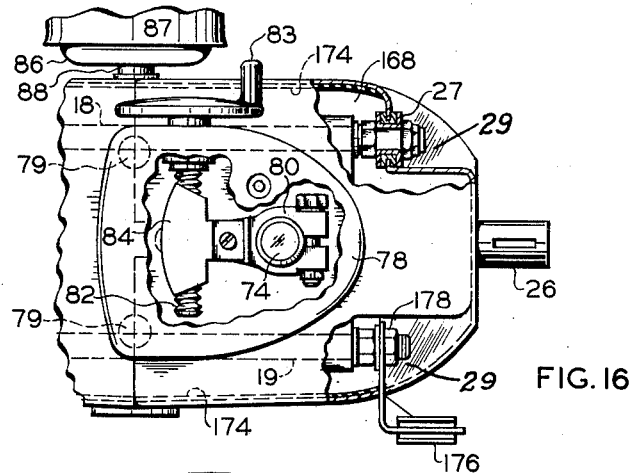
Figure 16 is a partial sectional view of the shroud surrounding the pump casing and control mechanism for shifting the yoke.

The extended portion of the pintle 74, as shown in Figures 2 and 16, extends into a control box 77 provided with a removable cover 78. The control box 77 is mounted by suitable screws to bosses 79 provided for that purpose on the valve block which extend through the pump and motor casing shrouds. The valve block 20 is provided with four of the bosses 79, two each on opposing sides of the valve block for alternative installation of the control box.

Referring now to Figures 2 and 16, within the control box 77 one end of an arm 80 is rigidly connected to the end of the pintle 74. The opposite end of the arm 80 is connected by a pin 81 to a hand wheel screw 82. One end of the pin 81 is rotatably mounted in the arm 80 and the screw 82 is threadable through the opposite end of the pin 81. A handwheel control 83 is rigidly fastened to the screw 82. An indicator dial 84 suitably fastened to the arm 80 so as to be movable therewith is viewable through a hole 85 provided in the cover 78 (Figure 17).

Thus, by turning the handwheel control 83 the yoke 70 may be shifted and its angle of inclination determined by reading the indicator dial 84.

For the purpose of filling the transmission, a combined funnel and expansion tank 86 is provided having a removable cover 87. The funnel 86 has a tube 88 threadable into any one of three passages 89, 90, or 91 provided in bosses 92, 93, and 94 located respectively on the valve block 20, the pump casing 14 and the motor casing 16. The passages 89, 90, and 91 open into a fluid supply space indicated by the numeral 95. As shown in Figures 2 and 5, the tube 88 is shown threaded into the boss 92 located on the valve block 20 while the passages 90 and 91 in the bosses 93 and 94 are closed by suitable plugs 96.

There is thus provided three different, convenient locations for filling the transmission.

A filter screen 97 mounted in a rubber grommet 98 is mounted by means of the grommet in the funnel 86.

Valve plates 99, shown in Figure 3, provided with arcuate shaped ports 100 and 101 extending from face to face corresponding to similar shaped ports 102 and 103 formed in and extending through the valve block (Figure 5) are journalled on the pump and motor shafts 26 and 28 against the opposite surface areas of the valve block to provide bearing surfaces against which the pump and motor cylinder barrels 42 and 43 rotate. The valve plate ports 100 and 101 cooperate with individual ports 104 (Figure 4) one at the end of each cylinder 58 of the cylinder barrels 42 and 43.

The opposite surfaces of the valve block 20 are provided with a pin 105 (Figures 6 and 10) insertable in a hole 106 (Figure 3) of the valve plate for preventing rotation of the latter.

Due to the fact that the porting of the valve block is adapted to form a closed system as the cylinder barrels rotate against the valve plates, provision is made for priming the pump during initial operation and for replenishing the main pump at a controlled pressure during normal operation.

Thus, in Figures 5 and 8, there is shown a replenishing pump, indicated generally by the numeral 107, which is mounted in a vertical passage 108 extending from the bottom of the valve block 20 to the shaft hole 38. The pump 107 is comprised of a piston 109 which, on the upward stroke, draws fluid into a fluid chamber 110 and which expels fluid from this chamber on the downward stroke through a check valve 111 mounted in a retainer 112. The retainer 112 is keyed to the casing at 113. A spring 114 serves to bias the piston 109 upwardly and a spring 115 serves to bias a "Micarta" disc 116 (Figure 9) downwardly so as to seat the latter upon the retainer 112 on the downward stroke of the piston 109. The piston 109 is operated on the downward stroke by an eccentric cam 117 formed on the left end of the pump shaft 26. The spring 114 operates the piston 109 on the upward stroke.

On the upward stroke of the piston 109 the "Micarta" disc 116 lifts and uncovers ports 118 in the retainer 112 connected to an undercut portion 119 of the retainer 112. A plurality of ports 120, one of which is shown in Figure 7, connect the fluid supply space 95 to the undercut portion 119. Thus, the fluid supply space 95 is connected to the chamber 110 when the "Micarta" disc 116 lifts and uncovers the ports 118 in the retainer 112 but is blocked from communication with the chamber 110 when the disc 116 seats. The diameter of the "Micarta" disc 116 is slightly less than the diameter of the chamber 110 so that when the disc lifts, fluid flows around the disc into the chamber.

A fluid chamber 121 is formed at the bottom of the valve block 20 by means of a plate 122 having a plurality of recesses 123, said plate being suitably bolted to the valve block. Fluid is expelled by the pump 107 through the check valve 111 to the chamber 121 on the downward stroke of the piston 109.

Chamber 121 is connected to two vertical fluid passages 124 and 125 located on opposite sides of the hole 108 (Figures 6 and 7). The passage 124 intersects the valve block arcuate port 102, and the passage 125 intersects the arcuate port 103. Mounted in the passages 124 and 125 are duplicate check valves 126 and 127 biased to the closed position by means of duplicate springs 128 and 130 of predetermined resistance.

The fluid chamber 121 is also connected to a hole 132 within which is mounted an accumulator piston 134 biased to the position shown by a spring 136. Located above the upper portion of the piston, as shown, are a plurality of ports 138 connecting the hole 132 to the fluid supply space 95. Another plurality of ports 140 also connect the upper portion of the hole 132 to the fluid supply space 95. The piston 134, in cooperation with the spring 136, is also adapted to act as a replenishing relief valve and will by-pass pressure fluid from the pump 107 through the ports 138 to the fluid supply space 95 when the bottom portion of the piston 134 cracks over the ports 138. A servo port 142 constructed in a boss 144 of the plate 122 is connected to the fluid chamber 121. The servo port 142 is closed by a plate 146 screwed to the valve block 20 when servo controls are not used in connection with the yoke 70.

The replenishing pump piston 109 is provided with an undercut portion 147 which is connected to the extreme upper portion of the chamber 110. The undercut portion 147 is connected to the central portion of the valve block shaft hole 38 when the pump piston 109 is at the top of its stroke as shown in Figure 5. Any entrapped air in the upper portion of the replenishing pump chamber 110 is bled to the fluid supply space 95 by means of through grooves 149 formed on opposite sides of the shaft hole 38 and grooves 151 (Figure 10) formed in the opposite faces of the valve block 20, the latter of which connect to the fluid supply space 95.

The valve block 20 is also provided with pressure passages 148 and 150 which are closed by plates 152 and 154 suitably screwed to the valve block 20 when a pressure control for changing the angle of inclination of the yoke 70 is not used.

The pressure passages 148 and 150, respectively, intersect the arcuate valve block ports 102 and 103.

Duplicate relief valve assemblies, indicated generally by the numerals 155 and 157, are mounted in passages 159 and 161 located above the pressure control passages 148 and 150 (Figures 5 and 7) in the valve block 20. The relief valves are adapted to relieve excessive pressure fluid from the pressure port to the supply port of the valve block depending upon which side of neutral the yoke 70 is located.

Figures 13, 14:
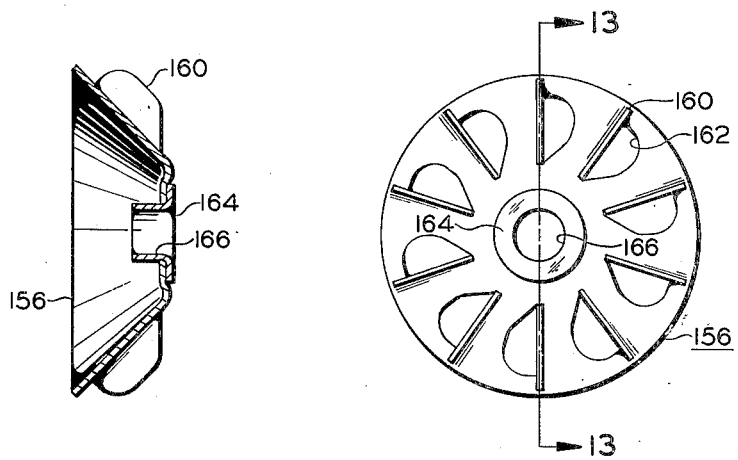
Figure 13 is a view taken on line 13—13 of Figure 14.
Figure 14 is a front view of the fan.
Figure 15:
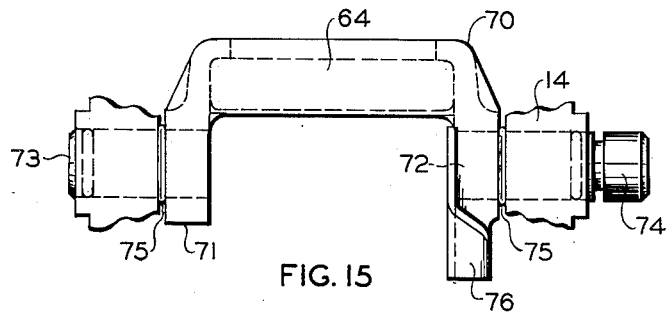
Figure 15 is a side view of the yoke.

The transmission is provided with a cooling system by mounting a fan 156 on the pump shaft 26 for rotation therewith and locating the same in an opening 158 provided in the right end of the shroud section 22 (Figures 1, 14, 16, and 17). The fan 156 may preferably be stamped from suitable sheet metal so as to form angularly disposed blades 160 and air flow passages 162 as shown in Figure 14. The fan 156 is provided with a hub 164 which may be spot welded thereto and which has a hole 166 proportioned for rigidly fastening the fan 156 on the pump shaft 26 (Figures 13 and 14). When fastened on the pump shaft 26, the fan 156 will rotate therewith to take in cool air from the pump end and blow the same through the air space formed between the shroud and the casing, said air space being indicated by the numeral 168, and out an opening 170 formed in the motor shroud section 24. In this way, the casings are cooled and likewise the oil within the casing.

Provision has also been made for deadening the sound caused by operation of the transmission and cooling system. The two shroud sections are connected to the pump and motor casings and to the valve block by means of the two upper through bolts 18. In order to avoid metal to metal contact, the rubber grommets 27 are placed between the casings and the shrouds where the upper through bolts 18 are inserted.

It should be noted that the lower through bolts 19 pass through holes 172 in the pump and motor shrouds and that they serve only to connect the casings to the valve block 20. The bolts 19 do not have any contact with the pump and motor casing shrouds. The shroud sections are of tubular or bell shaped form and are provided with indentations of pyramidal shape which strengthen the shroud. As the casings are preferably economically manufactured from aluminum alloy, the shroud effectively protects the casing from impact damage.

In order to further deaden any sound board effects caused from the operation of the transmission and cooling system, the inner surfaces of the shroud sections are substantially covered with a suitable sound deadening material indicated by the numeral 174.

It should also be noted that the yoke 70 is adapted to not only be shifted by the hand wheel shown in Figures 2 and 10, but that the same may be shifted in the conventional manner by connecting a suitable pressure control to one of the pressure passages 148 or 150 or by connecting a servo operating control to the servo port 142.

The transmission is provided with mounting legs 176 fastened to the end of the lower through bolts by means of nuts 178.

In operation, the pump is initially primed by the replenishing pump 107. Fluid is withdrawn by the replenishing pump on the upward stroke of the piston 109 from the supply space 95 in the casings to the fluid chamber 110 in the pump 107. The supply space 95 is connected to the chamber 110 by means of the fluid ports 120, the undercut portion 119 of the retainer 112, and the fluid ports 118. The lifting of the disc 116 on the suction stroke of the piston 109 uncovers the ports 118 and permits fluid to flow around the disc to the chamber 110. On the downward stroke of the piston 109 the disc 116 seats on the retainer 112 blocking the ports 118. The piston 109 forces fluid from the chamber 110 through the check valve 111 to the chamber 121 at the bottom of the valve block 20. The check valve spring 128 has less resistance than the accumulator spring 136 and fluid from the pump 107 is directed by means of the vertical passage 124 to the inlet port 102 of the valve block 20. The pressure created at the outlet port 103 of the valve block which is connected to the vertical passage 125 will maintain the check valve 127 in the passage 125 seated. As the pump cylinder barrel 42 rotates, some of the pistons 60 in the cylinders 58 thereof will be forced toward the valve block 20 by means of the inclined inner race 62 of the thrust bearing 64. Fluid will be forced from these cylinders by the pistons to the opposing cylinders of the motor cylinder barrel. The opposing pistons of the motor cylinder barrel will be forced in drivable engagement with the thrust plate 62 of the motor section. As the pistons of the motor cylinder barrel reciprocate, the motor cylinder barrel will rotate, thus rotating the motor shaft 28 connected thereto. The remainder of the pistons within the motor cylinder barrel 43 will be forced inwardly toward the valve block by the motor thrust bearing 62 forcing fluid into the opposing pump cylinders containing the pistons shifting away from the valve block on their suction stroke. Consequently, a closed circuit is created by the valve block porting and the opposed cylinder barrels rotating against the valve plates. The angle of inclination of the pump and motor thrust bearing determines the length of stroke of the pistons within the cylinder barrels and consequently their fluid displacement. By rotating the hand wheel 83 to shift the yoke 70 towards the neutral position the stroke of the pump pistons become shorter and consequently its fluid displacement is decreased. It follows, that when the fluid displacement of the pump is decreased that the speed of the motor is proportionately decreased. At the neutral point of the yoke 70 the pistons within the pump cylinder barrel do not reciprocate and the motor becomes stalled.

If the yoke 70 is shifted in the opposite direction from this neutral position the arcuate ports 102 and 103 of the valve block 20 are reversed in their function of inlet and outlet ports. When the yoke 70 is shifted to the opposite side of neutral, fluid is admitted during the initial priming operation, from the replenishing pump to the arcuate port 103 through the vertical passage 125 and the check valve 127 mounted therein. The check valve 126 in the vertical passage 124 remains seated.

During operation, one of the relief valves 155 will serve to relieve excessive pressure fluid from the pressure side of the pump to the inlet side depending upon which side of neutral the yoke 70 is located.

During operation, any leakage in the closed system is made up by the replenishing pump 107. Replenishing fluid is supplied to the inlet side of the pump at a pressure equal to the by-pass pressure, determined by the setting of the spring 136 of the accumulator piston 134, minus the drop in pressure across one of the check valves 126 and 127 determined by the springs 128 or 130. Thus, when servo controls or pressure controls are not associated with the yoke 70, the accumulator will be loaded with fluid at a pressure determined by the setting of the spring 136 and the output of the replenishing pump will be by-passed to the supply space 95 through the ports 138. Any leakage in the closed system is thus supplied to the arcuate inlet port of the valve block at the by-pass pressure minus the drop in pressure across the check valve connected to the arcuate inlet port. The pistons reciprocating within the cylinder barrels are likewise held against the thrust bearings 62 at this pressure.

When a servo control is used in conjunction with the transmission it may be connected to the servo port 142. The servo control may be operated at the controlled by-pass pressure as determined by the setting of the spring 136 and the pistons in the cylinder barrels will be maintained against the inner race 62 of the thrust bearings at another controlled pressure. This latter controlled pressure, as stated above, is the by-pass pressure minus the drop in pressure across the inlet check valve 121 or 127.

It should be noted that the pump and motor casings, the cylinder barrels and the valve block, may preferably be die cast resulting in mass production economy. The shroud and fan may be stamped from suitable thin sheet metal.

It should also be noted that the die cast transmission is also provided with an efficient and economical cooling system with which is associated an efficient means for deadening sound board effects. The shrouds not only provide an air space for the cooling system, but in addition provide adequate protection from impact damage to the transmission.

While the form of embodiment of the invention as herein disclosed constitutes a preferred form, it is to be understood that other forms might be adopted, all coming within the scope of the claim which follows.

What is claimed is as follows:

A self-contained hydraulic power transmission comprising a two-section casing within which is a main pump and motor, a stationary valve block forming a partition between the casing sections common to the pump and motor for controlling the admission and exhaust of fluid to and from the pump and motor, said casing sections and valve block having bolt holes extending therethrough registering with each other, a protective shroud surrounding the casing sections and valve block, the shroud comprising a pair of similar bell-shaped sections and having a plurality of inwardly extending indentations near the shoulder of each bell and including bolt holes extending through the indentations registering with the sectional casing and valve block bolt holes, and bolts mounted in the casing sections, valve block and shroud bolt holes serving to connect the two casing sections in abutting relation to the valve block and also to maintain the two shroud sections with their open ends in abutting relationship with each other.

KENNETH I. POSTEL.
JOSEPH P. HORVATH.

References Cited in the file of this patent
UNITED STATES PATENTS

| Number | Name | Date |
|---|---|---|
| 1,044,838 | Williams | Nov. 19, 1912 |
| 1,080,282 | Kellogg | Dec. 2, 1913 |
| 1,250,564 | Crain | Dec. 18, 1917 |
| 1,308,844 | Ferris et al. | July 8, 1919 |
| 1,312,701 | Magie et al. | Aug. 12, 1919 |
| 1,539,616 | Williams | May 26, 1925 |
| 1,628,603 | Ferris | May 10, 1927 |
| 1,752,134 | Woodman | Mar. 25, 1930 |
| 1,924,017 | Bedford | Aug. 22, 1933 |
| 1,961,592 | Muller | June 5, 1934 |
| 1,967,838 | Norris | July 24, 1934 |
| 2,283,516 | Tyler | May 19, 1942 |
| 2,409,374 | McGill | Oct. 15, 1946 |

FOREIGN PATENTS

| Number | Country | Date |
|---|---|---|
| 14,791 | Great Britain | June 26, 1913 |